United States Patent [19]

Galeano

[11] 4,411,737
[45] Oct. 25, 1983

[54] PULP TREATING PROCESS
[75] Inventor: Sergio F. Galeano, Toledo, Ohio
[73] Assignee: Owens-Illinois, Inc., Toledo, Ohio
[21] Appl. No.: 289,944
[22] Filed: Aug. 4, 1981

Related U.S. Application Data

[63] Continuation of Ser. No. 103,141, Dec. 13, 1979, abandoned.
[51] Int. Cl.$^3$ ............................ D21C 5/02; D21C 9/00
[52] U.S. Cl. ............................................. 162/7; 162/8; 162/13; 162/82; 162/83; 162/90; 162/129
[58] Field of Search .................... 162/13, 25, 28, 82, 162/83, 90, 129, 7, 8

[56] References Cited

U.S. PATENT DOCUMENTS 1,921,539  8/1933  Richter ................................. 162/82
4,145,246  3/1979  Goheen et al. ........................ 162/23

FOREIGN PATENT DOCUMENTS 864412  2/1971  Canada .
1517226  6/1970  Fed. Rep. of Germany ........ 162/82

OTHER PUBLICATIONS

USDA Forest Service, P. Koch, Agriculture Handbook #420, 8/72, pp. 1436-1438, 1443.
H. J. Kvisgaard, "Ettersulfonering", Norsk Skogindustri, 4/65, pp. 155-163.
H. E. Worster, "The Present and Future of Alkaline Pulping", Pulp & Paper Canada, vol. 75, #10, 10/74, pp. 480-485.
K. P. Kringstad et al., "Sulphonation of High Yield Kraft Pulp", Svensk Papperstidning No. 13, 1974, pp. 480-485.
H. E. Worster et al., "Increased Linerboard Pulp Yield Through Sulfonation", TAPPI, vol. 58, No. 11, pp. 117-119.

*Primary Examiner*—William F. Smith
*Attorney, Agent, or Firm*—J. R. Nelson; M. E. Click

[57] ABSTRACT

An improvement in a method for producing paper is disclosed. The paper-producing method involves the steps of preparing a slurry of high lignin content having a predetermined freeness and containing from 1 to 20 percent by weight of fibers, refining the slurry to enable the production therefrom of paper having predetermined properties, forming a web from the slurry and drying the web. The improvement involves treating the high lignin content slurry, prior to the refining step, with a sodium, potassium or lithium alkaline sulfite/sulfide/carbonate solution at atmospheric pressure at a temperature of at least 60° C. and at a pH of at least 10 for from 10 to 60 minutes. The amount of the sulfite/sulfide/carbonate solution should be sufficient that the treatment increases the strength of paper made at the same degree of freeness. The slurry should be one in which at least 50 percent of the fibers are softwood fibers and containing not more than 3.0 percent of residual cooking chemicals.

7 Claims, 4 Drawing Figures

PULP TREATING PROCESS

This is a continuation, of application Ser. No. 103,141 filed Dec. 13, 1979 abandoned.

BACKGROUND OF THE INVENTION

Various suggestions have been made for improving the properties of chemical and chemical/mechanical wood pulps; for example, post-treatment of pulps with sulfur dioxide, bisulfite and neutral sulfite solutions is described in the following references: Kvisgaard, H. J. Norsk Skogind 5:155–163 (1965); Vinje, M. G., and Worster, H. E., Canadian Pat. No. 864,412, Feb. 23, 1971; Worster, H. E., Pulp and Paper Mag., Can., 75 (10): 45–50 (Oct. 1974); Kringstad, K. P., and Olausson, J., Svensk Papperstidning, 480–485 (Nov. 13, 1974); Worster, H. E., and Pudek, M. F., TAPPI 58, 11 (Nov. 1975). Such post-treatment processes have been suggested where the treatment was carried out at temperatures below the boiling point of the solution, as well as where the treatment was carried out at temperatures thereabove. However, so far as is known, all previously suggested treating processes for pulp have involved purification or control steps which were sufficiently expensive to make the processes unattractive for commercial use. For example, the indicated Kringstad and Olausson reference suggests that sodium sulfite can be used for the post-treatment of pulp slurries, but only at a pH not higher than approximately 9. When sodium sulfite is added in the proportions suggested to a pulp slurry from a commercial kraft cook the pH of the resulting slurry is normally higher than the upper limit at which sodium sulfite is claimed to be effective to improve the properties of paper made from the pulp. Accordingly, an expensive downward pH adjustment would be necessary, for example by addition of sulfuric acid.

BRIEF DESCRIPTION OF THE PRESENT INVENTION

The present invention is based upon the discovery that a sodium sulfite/sodium sulfide/sodium carbonate solution can be used for the post-treatment of pulp slurries, without the necessity for a pH adjustment and at atmospheric pressures and temperatures ranging from 60° C. to the boiling point. Such treatments significantly improve the tensile, CMT, Mullen and ring crush strengths of linerboard and the like produced from the treated slurries by comparison with the corresponding properties of linerboard produced from slurries containing no treating chemicals. After use, the residual treating chemicals can be recovered and used in producing cooking solutions or solutions for use in post-treatment of subsequent batches of pulp slurry.

DESCRIPTION OF PREFERRED EMBODIMENTS

EXAMPLE 1

Figure 1:
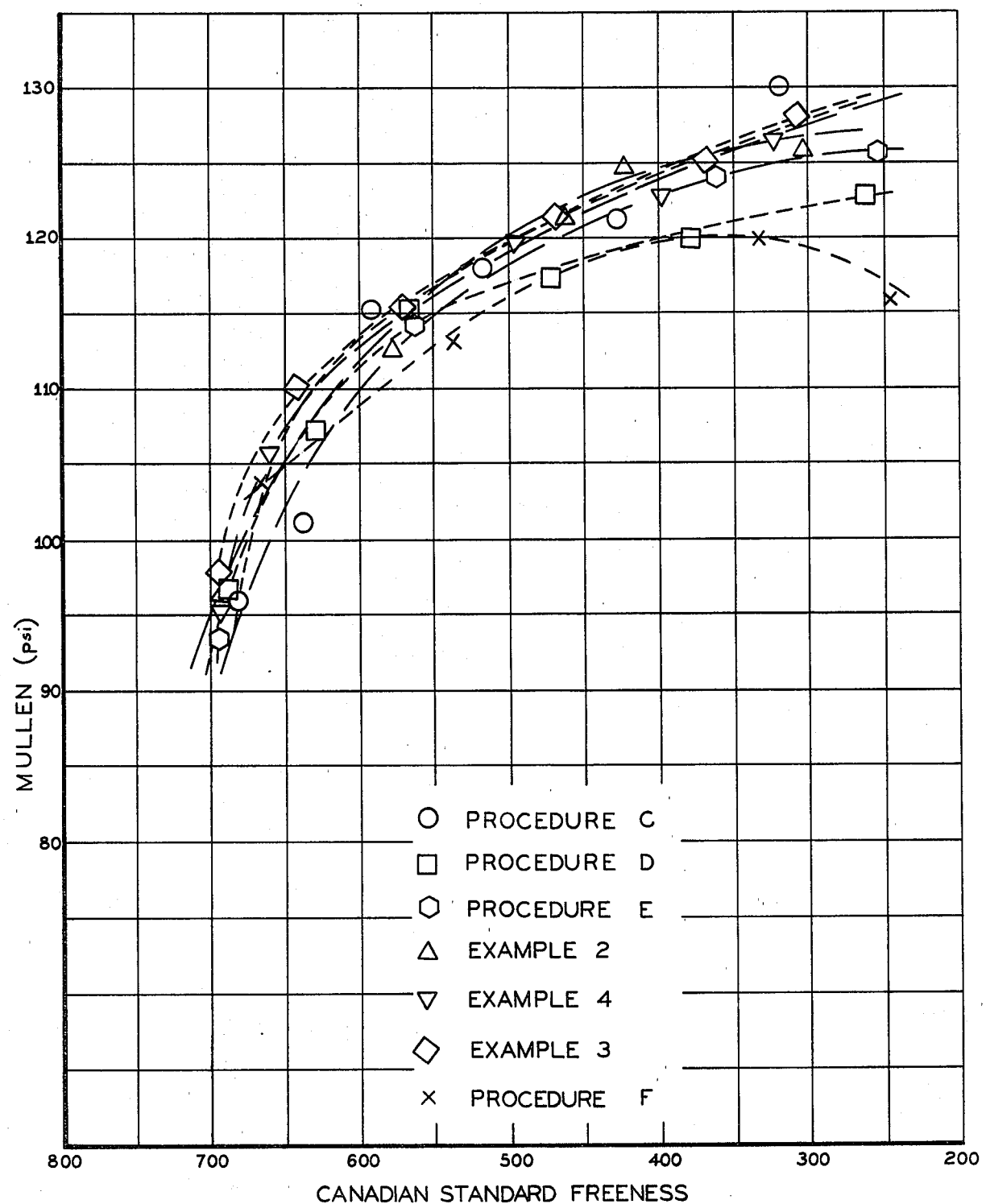
FIG. 1 is a plot of Mullen strength in psi against Canadian Standard Freeness in milliliters for 32 pound linerboard made by the procedures of Examples 2–4 and by comparative procedures C through F, hereof.

Softwood kraft pulp was prepared at 58.4 percent yield from softwood chips by cooking the chips in a batch digester, transferring the resulting cooked chips to a blow tank, and from thence to a high speed gravity discharge fiberizer where the cooked chips were mechanically treated. The resulting pulp was washed and thickened to wet lap on the wet end of a paper machine prior to subsequent treatment. A hydropulper was charged with 150 pounds, based upon oven dried pulp, of the wet lap, which was then reslurried at a consistency of 8 percent with additional water. The hydropulper was then charged with a total of 4.5 liters of black liquor from a commercial kraft paper making operation bringing the pH of the slurry therein to 9.7, 75 ml of concentrated $H_2SO_4$ bringing the pH to 9.0 and 42 gallons of a solution of sodium sulfite, sodium sulfide and sodium carbonate. The sodium sulfite-sodium sulfide-sodium carbonate solution contained 15 pounds of sodium sulfite as $Na_2SO_3$, 9.3 pounds of sodium sulfide as $Na_2S$ and 12.6 pounds of sodium carbonate as $Na_2CO_3$. After addition of the sodium sulfite-sodium sulfide-sodium carbonate solution, the pH of the slurry in the hydropulper was 10.3 and its temperature was 180° F. Reaction between the pulp and the added sodium sulfite-sodium sulfide-sodium carbonate was allowed to proceed for 60 minutes, at the end of which time the temperature was 183° F. and the pH was 10.3. The treated pulp was transferred to a 12 inch, twin-flow Sprout-Waldron refiner where it was refined to a Canadian Standard Freeness of 231 ml and used to produce linerboard having a nominal weight of 42 pounds per thousand square feet. The linerboard was tested to determine Mullen strength and tensile stength with the results set forth in Table I, below. The tensile strengths reported in Table I and elsewhere herein are averages of the strengths determined in the machine direction and in the cross direction.

For purposes of comparison, but not in accordance with the invention, substantially the procedure described above was used to produce 42 pound linerboard except that, in a first instance, Procedure A, after the pH adjustment to 9 with concentrated sulfuric acid, a concentrated solution containing 15 pounds as $Na_2SO_3$ of sodium sulfite and neither sodium sulfide nor sodium carbonate was charged to the hydropulper slurry, 8 percent consistency, and, in a second instance, Procedure B, the hydropulper slurry was transferred directly, without treatment, to the refiner. The pH at the end of the reaction in Procedure A was 8.2. The Canadian Standard Freeness of the pulps and the properties of the linerboards produced by the methods of Example 1 and of Procedures A and B are set forth in the following Table I:

TABLE I

|  | Canadian Standard Freeness | Mullen Strength (psi) | Tensile Strength (lb/in) |
|---|---|---|---|
| Example 1 | 231 | 124.9 | 79.8 |
| Procedure A | 295 | 116.5 | 69.2 |
| Procedure B | 290 | 107.9 | 71.6 |

The foregoing data show that the procedure of Example 1 improved the Mullen and tensile strengths significantly by comparison with those of Procedure B, and improved those strengths by 8.4 psi and 10.6 pounds/inch, respectively by comparison wth those of Procedure A.

EXAMPLES 2–7

Substantially the procedure described in Example 1 was repeated on laboratory scale equipment to produce 26 pound linerboard hand sheets at different mole ratios of sodium sulfite to sodium sulfide and different treating times following the addition of the sodium sulfite-sodium sulfide-sodium carbonate solution. The mole ratios used in these procedures, Examples 2–7, the proportion of sodium sulfite, sodium sulfide and sodium carbonate, expressed as percent, based upon oven dry pulp weight, the pH at the beginning of the treatment, after addition of the sodium sulfite, sodium sulfide and sodium carbonate and the spent pH, following heating subsequent to the sulfite-sulfide-carbonate addition are set forth in the following Table II; in all cases, the treatment was carried out at 75°–80° C., the pulp yield was substantially 100 percent, and the pulp had a consistency of 8.0 percent, i.e., the pulp constituted 8 percent by weight of the slurry, while water and treating chemicals constituted 92 percent thereof:

TABLE II

| Example | $Na_2SO_3$ Mole Ratio | Treatment Chemicals | | | Initial pH | Spent pH |
|---|---|---|---|---|---|---|
|  |  | $Na_2SO_3$ (%) | NaSH (%) | $Na_2CO_3$ (%) |  |  |
| 60 Min. Treatments | | | | | | |
| 2 | 0.786 | 10 | 5.65 | 3.96 | 11.5 | 10.5 |
| 3 | 1.428 | 10 | 3.11 | 3.96 | 11.3 | 10.6 |
| 4 | 1.00 | 10 | 4.44 | 3.96 | 11.3 | 10.5 |
| 35 Min. Treatments | | | | | | |
| 5 | 1.428 | 10 | 3.11 | 3.96 | 11.4 | 10.6 |
| 6 | 1.214 | 10 | 3.66 | 3.96 | 11.4 | 10.5 |
| 7 | 0.786 | 10 | 5.65 | 3.96 | 11.5 | 10.5 |

As can be seen in examples 2 and 5 of Table II, the weight ratio of sodium-sulfide as NaSH to sodium-carbonate is in the range of about 0.78/1.00 to 1.4/1.0. For purposes of comparison, but not in accordance with the invention, the procedure of Examples 2–7 was also carried out; using 60 and 35 minute treatment times and 10 percent based upon the weight of the oven dried pulp of sodium sulfite and no sodium sulfide or sodium carbonate; using 60 and 35 minute treatment times and 3.66 percent, based upon the weight of the oven dried pulp, of sodium sulfide and 3.96 percent, on the indicated basis, of sodium carbonate; with a 60 minute treatment time, using 3.11 percent of sodium sulfide and 3.96 percent of sodium carbonate, both on the indicated basis; and with 60 and 35 minute treatment times and no treating chemicals added. Data concerning these procedures are presented in the following Table III, which is similar to the foregoing Table II relating to Examples 2–7 (in Table III, the indicia N.D. indicate "not determined"):

TABLE III

| Procedure | Treatment Chemicals | | | Initial pH | Spent pH |
|---|---|---|---|---|---|
|  | $Na_2SO_3$ % | NaSH % | $Na_2CO_3$ % |  |  |
| 60 Min Treatments | | | | | |
| C | 10 | — | — | 9.0 | 8.6 |
| D | — | 3.11 | 3.96 | 11.4 | 10.3 |
| E | — | 3.66 | 3.96 | 11.2 | 10.3 |
| F | — | — | — | 9.0 | N.D. |
| 35 Min Treatments | | | | | |
| G | 10 | — | — | 9.0 | 8.7 |
| H | — | 3.66 | 3.96 | 11.3 | 10.4 |
| I | — | — | — | 9.0 | N.D. |

Each of the procedures of Examples 2 through 7 as well as each of those of procedures C through G, was carried out using slurries of an original high Canadian Standard Freeness, ranging from about 650 to about 750 ml, and the Mullen strength in pounds per square inch was determined for each procedure after refining to various freenesses within the 250 ml to 700 ml range. The results with a 60 minute treatment time, Examples 2–4 and procedures C–F, are presented in FIG. 1 of the attached drawings. The data plotted in FIG. 1 demonstrate that the treatments of Examples 2–4 improved the Mullen strengths significantly by comparison with the treatments of procedures D through F, and by about the same amount as did the treatment of procedure C. Since the treatment of procedure C was carried out at pH 8.6 to 9, that of Examples 2–4, carried out at pH 10.5–11.5, is unexpectedly advantageous by comparison therewith because the pH adjustment required to carry out the treatment of procedure C is unnecessary in carrying out that of Examples 2–4.

Figure 2:
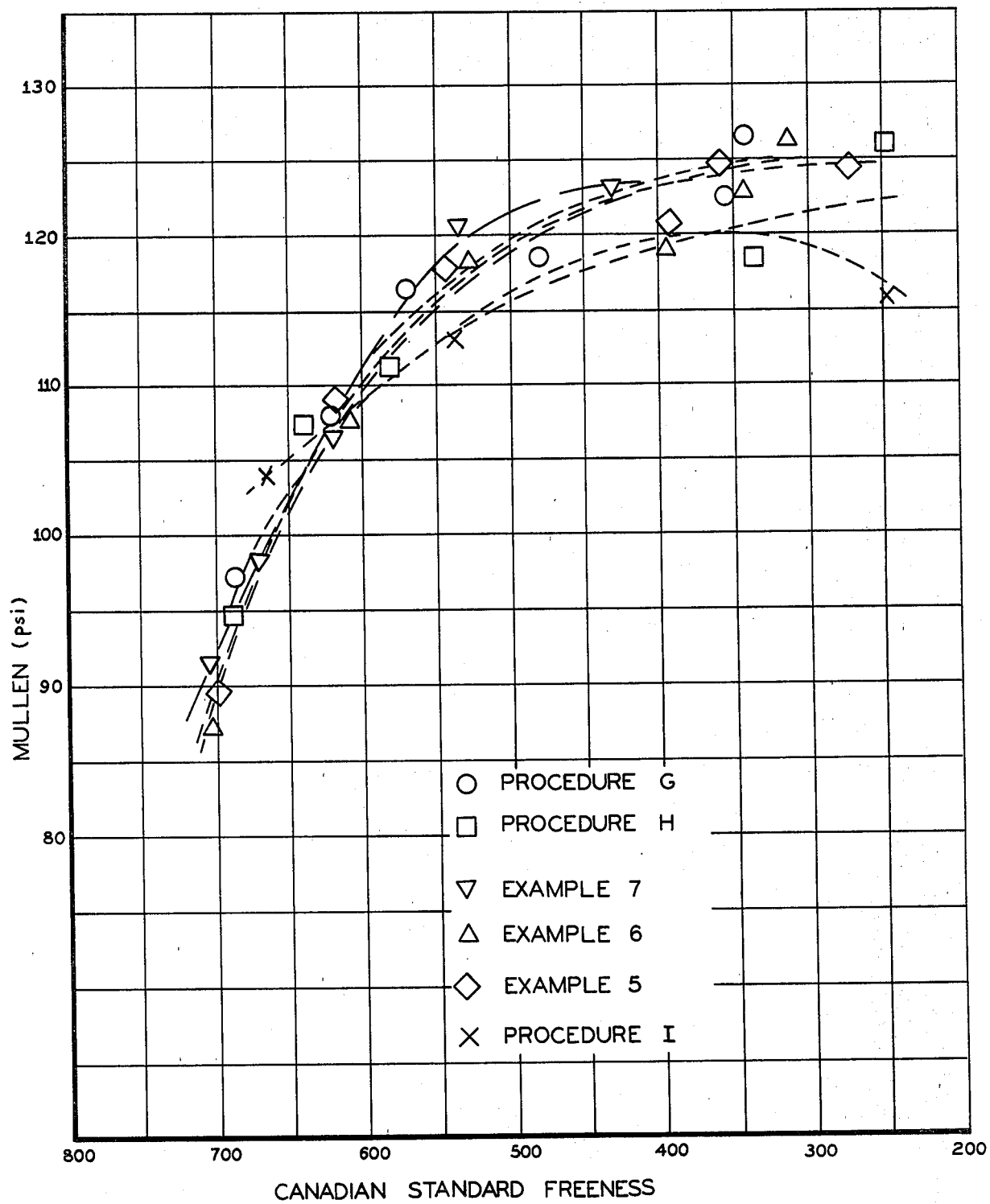
FIG. 2 is a plot similar to FIG. 1, but showing the properties of 26 pound linerboard hand sheets produced by the procedures of Examples 5–7 and of comparative procedures G–I.

The results with a 35 minute treatment time, Examples 5–7 and procedures G–I, are presented in FIG. 2 of the attached drawings. The data of FIG. 2 demonstrate that the treatments of Examples 5–7 improve the Mullen strengths significantly by comparison with the treatments of procedures H and I, and by about the same amount as did the treatment of procedure G. Since the treatment of procedure G was carried out at pH 8.7 to 9, that of Examples 5–7, carried out at pH 10.5–11.5, is unexpectedly advantageous by comparison therewith because, as previously explained, no pH adjustment is required.

EXAMPLES 8 and 9

A pulp slurry was prepared by fiberizing corrugated board clippings in water to a Canadian Standard Freeness of about 700 ml. The slurry was then adjusted to a consistency of substantially 8 percent by adding thereto either water or an aqueous solution of treating chemicals and the resulting slurry, 8 percent consistency, was heated for 30 minutes (Example 8) or for 60 minutes (Example 9) at 80° C.; 26 pound hand sheets were then prepared from the eated slurry and tested as subsequently explained. The identities of two slurries, Examples 8 and 9, prepared as described in this paragraph, are set forth in the following Table IV:

TABLE IV

| Example | Treatment Chemicals Based Upon Weight of Oven Dry Pulp | | | | Initial pH | Spent liquor pH |
|---|---|---|---|---|---|---|
| | Na$_2$SO$_3$ (%) | NaSH (%) | Na$_2$CO$_3$ (%) | NaOH (%) | | |
| 8 | 10 | 4.4 | 4.8 | — | 11.8 | 11.0 |
| 9 | 10 | 4.4 | 4.8 | — | 12.1 | 11.5 |

For purposes of comparison, but not in accordance with the invention, the procedure of Examples 8 and 9 was also carried out using, two instances, only sodium sulfite as a treating chemical using, in a third instance, only sodium hydroxide as a treating chemical and using, in fourth and fifth instances, no treating chemical. Data concerning these procedures are presented in the following Table V, which is similar to Table IV.

TABLE V

| Procedure | Treatment Chemicals | | | | pH | Spent liquor pH |
|---|---|---|---|---|---|---|
| | Na$_2$SO$_3$ % | NaSH % | Na$_2$CO$_3$ % | NaOH % | | |
| J | 10 | — | — | — | 9.0 | 8.3 |
| K | 10 | — | — | — | 8.8 | 6.9 |
| L | — | — | — | 2.0 | 12.2 | 11.7 |
| M | — | — | — | — | 9.0 | 7.1 |
| N | — | — | — | — | 9.3 | 6.8 |
| O | 10 | 4.4 | 4.8 | — | 9.6 | 9.9 |

Figure 3:
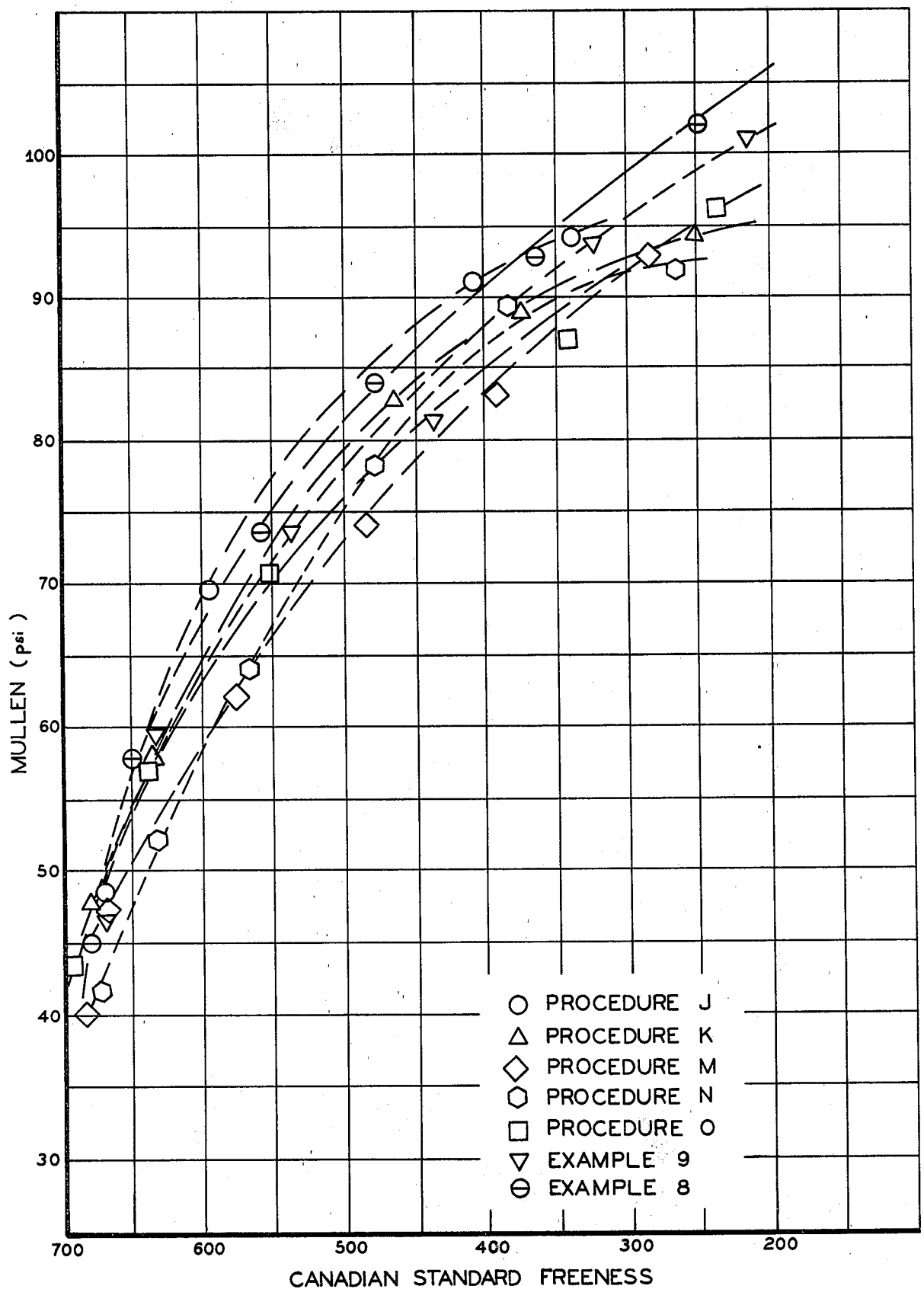
FIG. 3 is a plot similar to FIGS. 1 and 2, but showing properties of 26 pound hand sheets produced by the procedures of Examples 8 and 9 and by comparative procedures J K and M-O.
Figure 4:
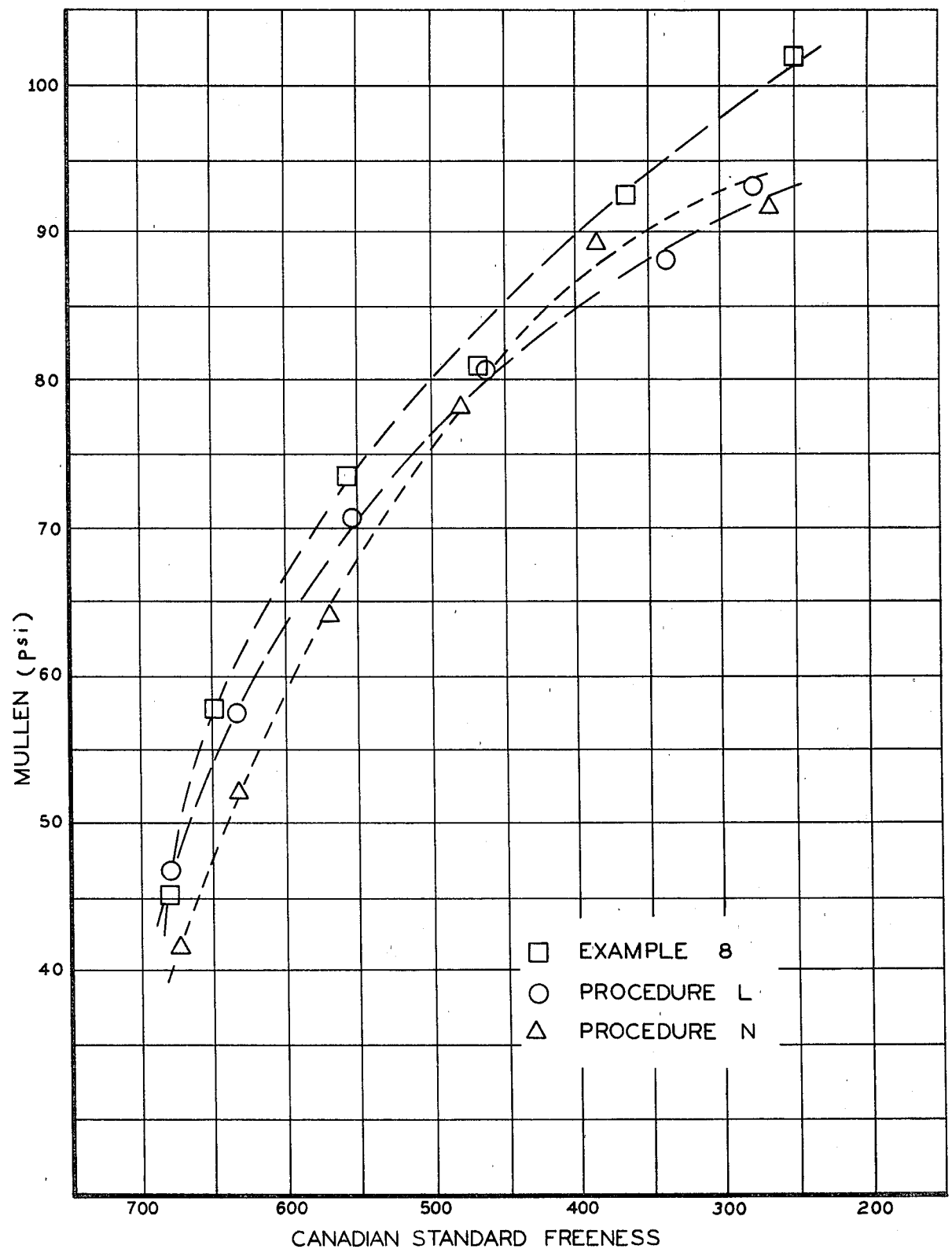
FIG. 4 is a plot similar to FIGS. 1–3, but showing the properties of 26 pound hand sheets made by the procedures of Example 8 and of comparative procedures L and N.

Mullen strength in psi is plotted in FIGS. 3 and 4 against Canadian Standard Freeness for each of Examples 8 and 9 and for each of Procedures J through O. The data plotted in FIGS. 3 and 4 demonstrate that the treatments of Examples 8 and 9 improve the Mullen strengths significantly by comparison with treatments of Procedures L through O, and by about the same amount as did the treatment of Procedures J and K. Since the treatments of Procedures J, K and M through O were carred out at a pH ranging from 8.8 to 9.6, that of Examples 8 and 9, carried out at a pH of 11.8 and 12.1, respectively, is unexpectedly advantageous by comparison therwith because there is no need for an acidification. The treatment of Procedure O was with a sodium sulfite-sodium sulfide-sodium carbonate solution wherein the mole ratio of sodium sulfite to sodium sulfide was 1:1, but at a low pH of 9.6 at which substantially no improvement in Mullen strength was detected by comparison with Procedures M and N where no chemical additive was used. The data of FIGS. 3 and 4 demonstrate, therefore, that the pH of the treatment according to the instant invention is critical and must be higher than that at which a sodium sulfite solution has been suggested as a useful treating chemical for pulp slurries.

The tensile strength, pounds per inch, ring crush, pounds and CMT, pounds, were also determined for handsheets produced from the slurries of Example 8 and of Procedures L and N at Canadian Standard Freenesses of 650 ml, 550 ml and 450 ml. These data are presented in Table VI, below:

TABLE VI

| | Tensile (lb/in) | | | Ring Crush (lb) | | | CMT (lb) | | |
|---|---|---|---|---|---|---|---|---|---|
| | 650 CSF | 550 CSF | 450 CSF | 650 CSF | 550 CSF | 450 CSF | 650 CSF | 550 CSF | 450 CSF |
| Example 8 | 25 | 37 | 43 | 48 | 55 | 58 | 28 | 43 | 53 |
| Procedure L | 25 | 35 | 41 | 45 | 53 | 57 | 23 | 39 | 50 |
| Procedure N | 23 | 31 | 38 | 40 | 52 | 55 | 20 | 35 | 48 |

By comparison with Procedure N, untreated pulp, that of Example 8 produced handsheets having improved tensile strength ranging from 3 to 6 pounds per inch, improved ring crush ranging from 5 to 8 pounds, and improved CMT ranging from 5 to 7 pounds.

In producing linerboard, corrugated paper and like sheet materials from pulp slurries, the yield of linerboard or the like is important. Yield, usually expressed as the pounds of linerboard or the like produced from a given slurry per 100 pounds of wood chips or the like used to produce the slurry, varies as an inverse function of the severity of an initial semi-chemical, kraft or other cooking step. The initial cooking step can be severe because it is carried out at comparatively high temperatures, because high concentrations of cooking chemicals are used, or for both reasons. In producing linerboard or the like according to the method of the present invention the initial cooking conditions are controlled to produce high-yield pulps, e.g., having a yield of at least 55 pounds of linerboard or the like per 100 pounds of wood chips, on an oven dried basis, used to produce the pulp. A linerboard pulp having a yield of at least 55 pounds can be produced by the use of cooking conditions which are comparatively mild with respect to cooking temperature, cooking time and concentration of cooking chemicals and, as a consequence, produce pulp which is comparatively high in lignin content, usually containing an amount of lignin corresponding to a Kappa Number of at least 95. Preferably, pulps subjected to the treatment step of the instant invention have Kappa Numbers ranging from 95 to 125. A high yield pulp can also be produced by slurrying linerboard or the like scrap with water. In either case, a certain amount of fiberizing often accomplished by causing the slurry to flow between mechanical sheer plates, is necessary to enable the production of linerboard or the like having the requisite strength for any given purpose. In the case of a pulp slurry produced from wood chips by cooking, separation of the pulp from cooking chemicals, washing and reslurrying usually precedes the bulk of the mechanical working necessary to achieve the desired strength. As mechanical working progresses, the strength of the linerboard or the like made therefrom increases and the "freeness," usually measured as the Canadian Standard Freeness, and reported in milliliters, decreases. As a practical matter, a decrease in "freeness" of a pulp slurry is manifested when the slurry is cast on a paper making machine by an increase in the time required for the water of the slurry to drain through the screen of the paper making machine.

The best mode presently contemplated for practicing the instant invention involves what may be called a substitution of the treatment step of the invention for a portion of the mechanical defiberizing which would otherwise be necessary to enable the production of linerboard or the like having a requisite degree of strength. This substitution can be accomplished by mechanical refining to, say, a Canadian Standard Freeness of 700, subjecting the resulting slurry to a treatment step according to the instant invention, for instance according to the procedure of any of Examples 1 through 9, and then mechanically refining the treated pulp to a Canadian Standard Freeness at which the pulp will produce linerboard or the like having the requisite strength. If a strength of 115 psi Mullen is desired and the treatment is that of Example 2, above, the mechanical refining, after treatment, can be to a Canadian Standard Freeness of 550 (see FIG. 1) and the slurry can then be cast in a paper making machine to produce linerboard or the like; to produce linerboard or the like from untreated pulp, procedure F, FIG. 1, at a strength of 115 psi Mullen, it would be necessary to continue mechanical refining to a Canadian Standard Freeness of substantially 515 before casting and, as a consequence, it would not be possible to operate the paper making machine at as high a speed as it would with pulp treated as described in Example 2 and refined to a Canadian Standard Freeness of 550.

The method of the instant invention is also peculiarly useful in producing a slurry to be used for producing the top sheet of a multi-layer board. Such board is conventionally produced by successively casting two different slurries onto a paper making machine. The first slurry can be one which produces board of a given strength, and usually is cast at such a rate that it forms from 70 to 90 percent of the total desired thickness while the second slurry is one which produces board having a higher strength and desired printing properties, and is cast on top of a web formed from the first slurry, constituting the balance of the thickness of the desired board. In conventional practice, the second slurry is subjected to mechanical refining to a lower Canadian Standard Freeness than that of the first slurry in order to achieve the required smooth top surface. The present invention makes it possible to produce the equivalent of multi-layer board from a single slurry. The slurry is cast directly onto the paper making machine as the first slurry, while the second slurry can be the same material, but treated in accordance with the instant invention so that it forms a top sheet having suitable properties.

It will be appreciated that high lignin pulp slurries for treatment in accordance with the instant invention can be produced in all appropriate conventional ways, that linerboard and the like sheet materials can be produced from treated pulp slurries produced according to the method of the invention by all suitable known methods and that various changes and modifications can be made from the specific details of the process of the invention as disclosed herein without departing from the spirit and scope thereof as defined in the appended claims where, as elsewhere herein, the terms "percent" and "parts" are used to refer to percent and parts by weight, unless otherwise indicated. In its essential details, the invention is a treatment process for a slurry of high lignin content fibers. The slurry should contain from 1 to 20 percent of fibers; at least 50 percent of the fibers should be softwood fibers; and the slurry should contain not more than 3 percent of residual cooking chemicals. The slurry is refined to enable the production therefrom of paper having predetermined properites, and a web is formed from the slurry and dried. The process of the invention involves treating the high lignin content slurry, prior to the refining step, with a sodium potassium or lithium alkaline sulfite/sulfide/carbonate solution at atmospheric pressure at a temperature of at least 60° C. at a pH of at least 10 for from 10 to 60 minutes. The amount of the sulfite/sulfide/carbonate solution used to treat a slurry of high lignin fibers should be sufficient that the treatment increases the strength of paper made at the same degree of freeness, by comparison with paper made from the same slurry, without treatment, at that degree of freeness. Preferably, the treatment according to the invention is carried out with a sodium sulfite/sulfide/carbonate solution wherein the sodium sulfite/sulfide/carbonate solids constitute from about 15 percent to about 25 percent, most desirably from about 17 percent to about 20 percent, of the oven dried weight of the fibers in the slurry. It is also preferred that the mole ratio of the sodium sulfite to the sodium sulfide in the treating solution be from about 0.1:1 to 2.0:1, most desirably from 0.7:1 to 1.5:1.

What I claim is:

1. In a method for producing paper which includes the steps of preparing a slurry of fibers of high lignin content pulp having a predetermined freeness and containing from 1 to 20 percent by weight of fibers at least 50 percent of which are softwood fibers, and not more than 3.0 percent of residual cooking chemicals, refining the slurry to enable the production therefrom of paper having predetermined properties, forming a web from the slurry and drying the web, the improvement of treating the high lignin content pulp slurry, prior to the refining step, with about 15 to 25 percent by weight based on the oven dried weight of the fibers in the slurry of a sodium sulfite, sodium sulfide and sodium carbonate solution at atmospheric pressure at a temperature of at least 60° C. at a pH of at least 10 for from 10 to 60 minutes, the amount of the sulfite-sulfide-carbonate solution being sufficient that the treatment increases the strength of paper made at the same degree of freeness and without substantial loss in yield, the mole ratio of sodium sulfite to sodium sulfide being about 0.1:1 to 2.0:1.

2. The method of claim 1 in which the web is a high strength top-sheet of a linerboard.

3. In a method for producing paper, the improvement claimed in claim 1 wherein the sodium sulfite-sulfide-carbonate solids in the treating solution constitute from about 17 percent to about 20 percent, based upon the oven dried weight of the fibers in the paper-making slurry.

4. In a method for producing paper, the improvement claimed in claim 1 wherein the mole ratio of sodium sulfite to sodium sulfide, as $Na_2SO_3$ and $NaSH$, respectively, is from 0.7:1 to 1.5:1.

5. In a method for producing paper, the improvement wherein the high lignin content slurry treated as claimed in claim 1 has a Canadian Standard Freeness of at least 700 ml and wherein the treated pulp is mechanically refined to a Canadian Standard Freeness in the range of 300 to 600 ml.

6. A method as defined in claim 1 in which the weight ratio of sodium-sulfide as $NaSH$ to sodium-carbonate is in the range of about 0.78/1.0 to 1.4/1.0.

7. A method as defined in claim 1 for producing paperboard from corrugating board comprising the steps of loosening the fibers from the corrugated board in water with the help of mechanical action to form said slurry having a consistency of about 5 to 10 percent, said refining being to a Canadian Standard Freeness between about 280 to 700.

* * * * *